(12) United States Patent
Alexander et al.

(10) Patent No.: US 9,021,240 B2
(45) Date of Patent: Apr. 28, 2015

(54) SYSTEM AND METHOD FOR CONTROLLING RESTARTING OF INSTRUCTION FETCHING USING SPECULATIVE ADDRESS COMPUTATIONS

(75) Inventors: Khary J. Alexander, Poughkeepsie, NY (US); Brian R. Prasky, Wappingers Falls, NY (US); Anthony Saporito, Highland, NY (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 12/035,911

(22) Filed: Feb. 22, 2008

(65) Prior Publication Data
US 2009/0217015 A1 Aug. 27, 2009

(51) Int. Cl.
G06F 9/38 (2006.01)
G06F 9/32 (2006.01)

(52) U.S. Cl.
CPC ............ *G06F 9/3861* (2013.01); *G06F 9/3804* (2013.01); *G06F 9/3867* (2013.01); *G06F 9/322* (2013.01); *G06F 9/3806* (2013.01); *G06F 9/3842* (2013.01); *G06F 9/3838* (2013.01)

(58) Field of Classification Search
None
See application file for complete search history.

(56) References Cited

U.S. PATENT DOCUMENTS

| | | | |
|---|---|---|---|
| 7,152,153 B2 | 12/2006 | Hummel et al. | |
| 7,293,265 B2 | 11/2007 | Haghighat et al. | |
| 2001/0047467 A1* | 11/2001 | Yeh et al. | 712/228 |
| 2003/0097549 A1 | 5/2003 | Ukai et al. | |
| 2003/0120906 A1 | 6/2003 | Jourdan et al. | |
| 2003/0149862 A1 | 8/2003 | Kadambi | |
| 2004/0139281 A1* | 7/2004 | McDonald | 711/133 |
| 2004/0255104 A1 | 12/2004 | Akkary et al. | |
| 2005/0132175 A1 | 6/2005 | Henry et al. | |
| 2005/0149706 A1 | 7/2005 | Kruckemyer et al. | |
| 2006/0095745 A1* | 5/2006 | Tran | 712/238 |
| 2006/0095895 A1 | 5/2006 | K. | |
| 2007/0106888 A1 | 5/2007 | Chaudhry et al. | |
| 2007/0130451 A1 | 6/2007 | Caprioli et al. | |
| 2007/0283100 A1 | 12/2007 | Asano et al. | |
| 2008/0148028 A1* | 6/2008 | Grandou et al. | 712/238 |

OTHER PUBLICATIONS z/Architecture, Principles of Operation, Sixth Edition, Apr. 2007, Publication No. SA22-7832-05, copyright IBM Corp. 1990-2007, pp. 1-1218.

(Continued)

*Primary Examiner* — Jacob A Petranek
(74) *Attorney, Agent, or Firm* — Cantor Colburn LLP; Margaret McNamara (57) ABSTRACT

A system and method for controlling restarting of instruction fetching using speculative address computations in a processor are provided. The system includes a predicted target queue to hold branch prediction logic (BPL) generated target address values. The system also includes target selection logic including a recycle queue. The target selection logic selects a saved branch target value between a previously speculatively calculated branch target value from the recycle queue and an address value from the predicted target queue. The system further includes a compare block to identify a wrong target in response to a mismatch between the saved branch target value and a current calculated branch target, where instruction fetching is restarted in response to the wrong target.

17 Claims, 4 Drawing Sheets

(56) References Cited

OTHER PUBLICATIONS

Dong Ye, et al., A Reliable Return Address Stack: Microarchitectural Features to Defeat Stack Smashing, ACM SIGARCH Computer Architecture News, vol. 33, Issue 1 (Mar. 2005), Year of Publication: 2005, 11 pages.

Veerle Desmet, et al., Correct Alignment of a Return-Address-Stack after Call and Return Mispredictions, 4th WDDD (ISCA-32), Jun. 2005, 11 pages.

* cited by examiner

FIG. 4

SYSTEM AND METHOD FOR CONTROLLING RESTARTING OF INSTRUCTION FETCHING USING SPECULATIVE ADDRESS COMPUTATIONS

BACKGROUND OF THE INVENTION

This invention relates generally to improving computer system efficiency, and more particularly to controlling restarting of instruction fetching using speculative address computations in conjunction with a recycle queue.

Pipeline restarts are very costly in today's highly pipelined microprocessors. One type of pipeline restart is due to instruction stream changes by taken branches. Pipelined microprocessors can include branch prediction logic that attempts to anticipate a branch target address. Due to limitations, the branch prediction logic may miss a prediction. These surprise (non-predicted) guess taken (SGT) branches are detected based on instruction text decoded later in the pipeline, requiring a flush and restart at the correct branch target address. Since the restart is dependent on the computation of the target address there can also be additional latency between the detection and restart point, further increasing the cycle per instruction (CPI) penalty. Modern pipelined microprocessors utilize branch prediction schemes to avoid these costly restart performance penalties. However, the efficient detection and resolution of SGT branches is still important, as there is an inherent "learning" period where the branch prediction logic primes branch target buffers (BTBs) to record branch addresses taken. This learning period is exposed at startup where a branch is encountered for the first time and also due to branch history capacity effects, where a learned branch may be removed and needs to be re-learned when later re-encountered.

In order to minimize the effect of these execution dependencies some microprocessors allow speculative execution in conjunction with a recycle mechanism. For example, speculation may be done on the result of data cache (D-Cache) accesses and addressing mode consistency. In cases where the speculation is incorrect, the operation/instruction is repeated/recycled. This allows a performance gain over always stalling the pipeline until the result (e.g., target address calculated utilizing D-Cache operand return) of an operation is known for certain, as in most cases the speculated result is correct. In such a scheme, the SGT target fetch is speculatively initiated as soon as a branch address is computed and later repeated/restarted if the branch is recycled. However, restarting instruction fetching on speculated address values can cause additional performance bottlenecks, as an instruction can be recycled multiple times before all speculations are resolved. Additionally, useful data in the instruction cache may be replaced with speculatively fetched data that may not actually be useful.

It would be beneficial to develop an approach to control restarting of instruction fetching using speculative address computations in a processor. Such an approach should limit repeated instruction fetching to cases where a wrong target value has been identified. Furthermore, modifications to higher levels of a cache memory hierarchy should be avoided when speculative instructions are not located in local cache. Accordingly, there is a need in the art for controlling restarting of instruction fetching using speculative address computations in a processor.

BRIEF SUMMARY OF THE INVENTION

An exemplary embodiment includes a system for controlling restarting of instruction fetching using speculative address computations in a processor. The system includes a predicted target queue to hold branch prediction logic (BPL) generated target address values. The system also includes target selection logic including a recycle queue. The target selection logic selects a saved branch target value between a previously speculatively calculated branch target value from the recycle queue and an address value from the predicted target queue. The system further includes a compare block to identify a wrong target in response to a mismatch between the saved branch target value and a current calculated branch target, where instruction fetching is restarted in response to the wrong target.

Another exemplary embodiment includes a method for controlling restarting of instruction fetching using speculative address computations in a processor. The method includes receiving a current calculated branch target value, and selecting a saved branch target value between a previously speculatively calculated branch target value in a recycle queue and a predicted target queue. The method also includes identifying a wrong target in response to a mismatch between the saved branch target value and the current calculated branch target, and restarting instruction fetching in response to the wrong target.

A further exemplary embodiment includes a system for controlling restarting of instruction fetching using speculative address computations in a processor. The system includes an instruction fetching unit (IFU) including branch prediction logic (BPL). The BPL generates address values for a predicted target queue. The system also includes an instruction decoding unit (IDU) including surprise (non-predicted) guess taken (SGT) detection logic, and an address generator (AGEN) to generate a calculated branch target value. The calculated branch target is compared against a previously utilized (for target fetching) branch target value, and in response to a miscompare, instruction fetching is restarted at the IFU.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides control for restarting of instruction fetching using speculative address computations. In a pipelined processor, branch prediction logic (BPL) predicts branch target addresses using a history of previously taken branches in an attempt to prevent pipeline stalls that can occur when a branch instruction causes a change in a fetching target address. Surprise guess taken (SGT) branches are guess taken branches that were not predicted by the BPL. Once detected, instruction fetching needs to wait on the calculation of the branch's target address before it can begin fetching the new target stream. Deeply pipelined in-order processors can experience a substantial latency if the pipeline stalls while waiting until all older dependencies are resolved. Speculative execution may be used to mitigate the impact of pipeline stalls, allowing the instructions to advance deeper in the pipeline before reacting. If the speculation is incorrect, the instruction can be recycled by returning it to an earlier position in the pipeline to correctly resolve the instruction. A given instruction may be recycled many times before it is finally executed with all speculations resolved.

As further described herein, the restart cost associated with re-fetching instructions can be further minimized by detecting and handling cases where the branch target address utilized for a target fetch was incorrect and only repeating the fetch in those cases. This is accomplished utilizing a recycle queue that stores the computed targets of instructions at execution time for use upon potential recycle. The recycle queue is used in conjunction with existing wrong target (wrt) compares for traditional predicted target verification. This allows an early restart of instruction fetching as soon as the initial target address of the branch is computed. If, upon recycle, it is determined that the last address used to speculatively restart was wrong, a corrective restart is taken. Otherwise, there is no further restart and the early fetch, based on the now verified to be correct speculative resource, removes a number of cycles from the restart penalty.

In a recycle window, all instructions may be recycled despite their relative dependencies and re-executed in order. For recycles due to data cache misses for instance, there are instructions that are known to be unaffected by the recycle because they are not dependent on the instruction with the cache miss. For these instructions, their target address should be the same both before and after recycle, allowing the use of the compare output as a self-correcting check for enhancing system reliability, availability, and serviceability (RAS). In other words, the recycle window is taken advantage of to obtain the RAS quality of having "N" additional redundant target address calculations, where N is the number of recycle passes, without the actual hardware cost.

In an exemplary embodiment, a configurable throttle mechanism is employed to stop instruction fetches from going beyond the first level (L1) of instruction caching. When a fetch request misses at a level in the cache hierarchy, a request is typically made to the next higher level, where it can also miss. This chain of requests may go all the way back to disk before a request is successful, with increasing latencies at every level. The retrieved line of data is then returned and installed at each level of the hierarchy back down to the L1. By ensuring that instruction fetches based on speculated results under recycle do not go out to the next higher level (L2), any negative performance impact of fetching on an incorrect target address is avoided. This is most useful in the pathological case where the incorrect target address misses the L1 and retrieves a line from memory that replaces the line containing the true restart target instruction. Then on completion of the recycle window, the true target address is fetched after a wrt restart and now misses in the L1 and potentially other levels, adding the associated penalty to the overall SGT restart latency. Using the configurable throttle mechanism, higher levels in the cache hierarchy can remain undisturbed, preventing an incorrectly fetched instruction from replacing data at a location in local cache that may be needed shortly.

Figure 1:
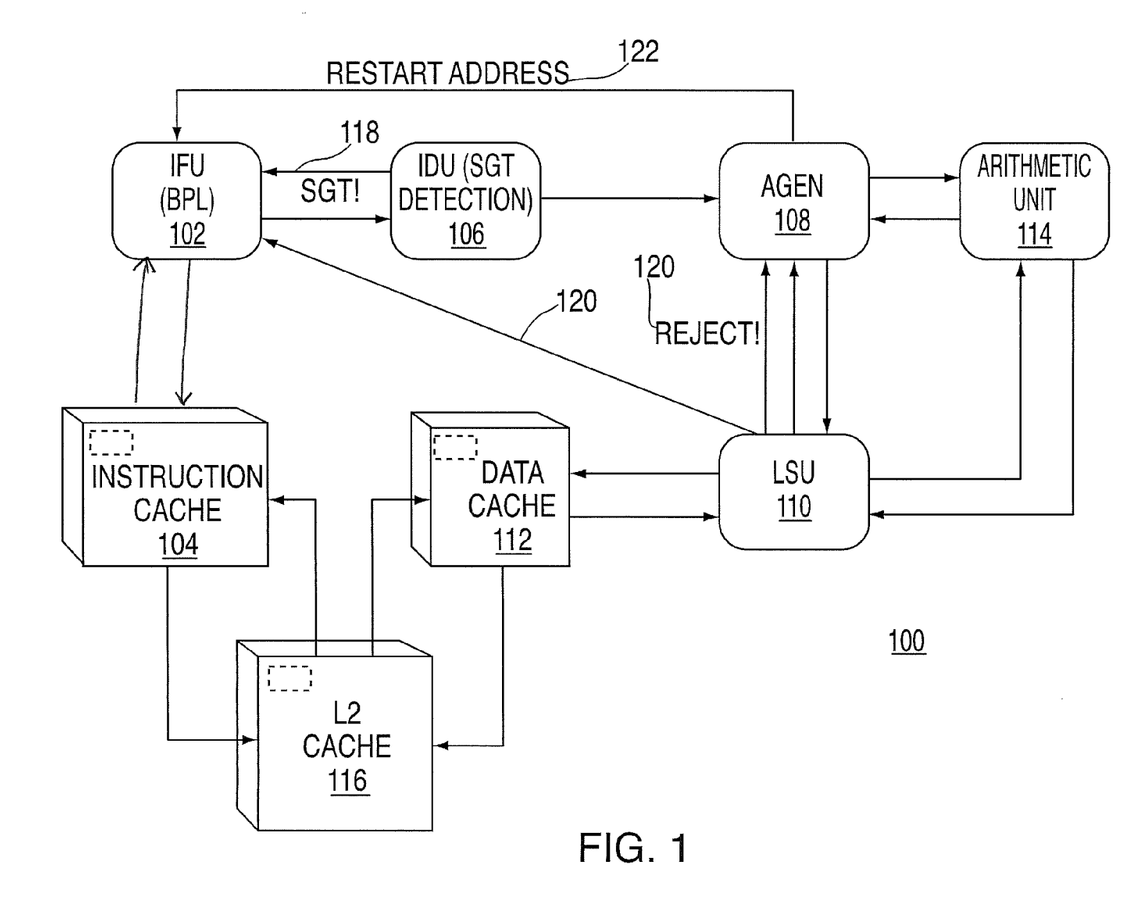
FIG. 1 depicts a block diagram of a system for controlling restarting of instruction fetching using speculative address computations in accordance with an exemplary embodiment.

Turning now to FIG. 1, a system 100, which represents a portion of a pipeline in a microprocessor, is depicted. The system 100 includes an instruction fetching unit (IFU) 102 that obtains instruction text from an instruction cache (I-Cache) 104 and delivers it to an instruction decode unit (IDU) 106, which parses and determines individual instructions. To execute instructions, a combination of an operand address generator unit (AGEN) 108, a load store unit (LSU) 110 which accesses data cache (D-Cache) 112, and one or more arithmetic units 114 are utilized. BPL resides in the front end of the IFU 102, detecting instruction stream modifying instructions (e.g., taken branches) and facilitating pipeline restarts with minimal penalties. SGT detection is later in the pipeline in the IDU 106 and has a dependency on later stages in the AGEN 108. There is a second level of caching (L2) 116 that connects the I-Cache 104 and D-Cache 112 to the rest of the system memory hierarchy (not depicted). Each of the functional blocks in the system 100 can encompass multiple pipeline stages and may support parallel execution of instruction groups, e.g., a superscalar architecture.

Instructions that are fetched in the system 100 can include branches that redirect the sequence of instructions executed. The BPL in the IFU 102 may predict that a branch will be taken and start fetching instructions at the predicted branch target address. When a branch is not detected by the BPL in the IFU 102, it is later detected as a surprise branch in the IDU 106. If this is a taken indirect branch, a pipeline restart cannot be completed until a target address is generated in the AGEN 108 and delivered to the IFU 102, creating costly multi-stage bubbles in the pipeline. Even at the time when the AGEN 108 performs address calculations, the restart address may not be correct due to instruction dependencies if speculative execution is allowed to minimize the restart penalty. For example, the target of a branch may be dependent on the result of an older load instruction and resolved by an address generation interlock (AGI). To minimize these penalties the pipeline in the system 100 is optimized to execute the dependent instruction as early as possible based on the result of the load instruction before knowing that the result is correct. If a miss occurs in accessing the D-Cache 112 for the load instruction, the resulting data delivered is unpredictable and can lead to dirty/incorrect calculated target addresses for branches that were speculatively executed on the result. In such a case, both the load and the branch are recycled. Various signals can be exchanged in the system 100 to communicate target address issues. For example, the IDU 106 declares detection of an SGT via signal 118 to the IFU 102. The LSU 110 can determine address issues associated with accessing the D-Cache 112 and output a reject signal 120 to both the IFU 102 and the AGEN 108. The AGEN 108 also outputs a restart address signal 122 to the IFU 102 to trigger restarting of instruction fetching.

Figure 2:
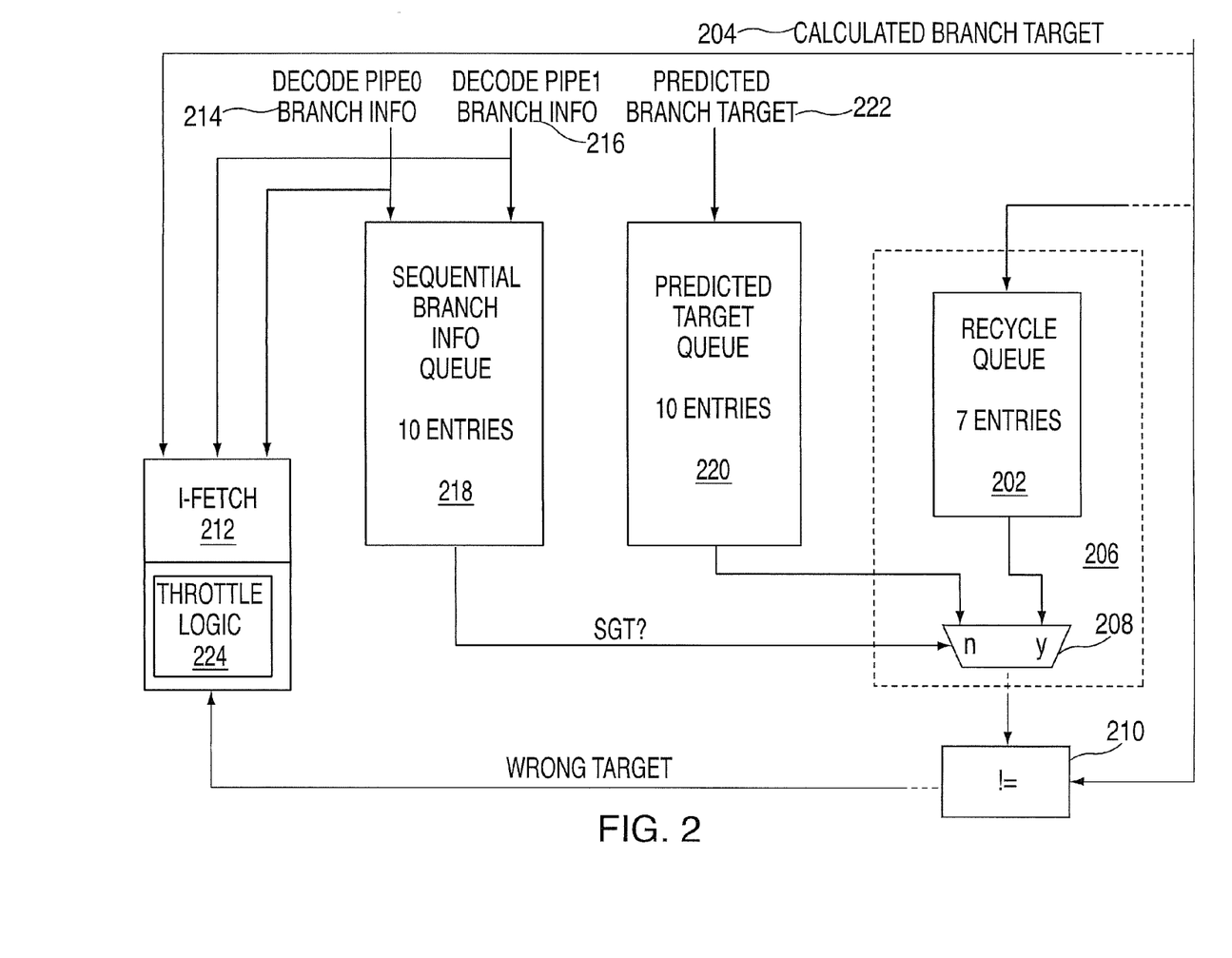
FIG. 2 depicts a block diagram of queues for generating a wrong target indication in accordance with an exemplary embodiment.

FIG. 2 depicts a block diagram of queues for generating a wrt signal in accordance with an exemplary embodiment as part of the system 100 of FIG. 1. A recycle queue 202 receives calculated branch target 204 results based on speculative results of older instructions. The recycle queue 202 can receive the calculated branch target 204 values from the AGEN 108 of FIG. 1. These addresses may be used for early fetching of SGT branch targets. This enables detection of cases where the initial calculated branch target 204 was incorrect by comparing values against recomputed addresses under recycle. By definition, a branch cannot be both dynamically predicted and SGT. This supports utilization of pre-existing compare hardware in the system 100 of FIG. 1 to detect the wrt at the minimal additional hardware cost. Target selection logic 206 includes a combination of the recycle queue 202 and a pre-wrt compare multiplexer 208. A wrt can be detected by compare block 210 as a mismatch between the calculated branch target 204 and a saved branch target value output from the target selection logic 206. A corrective restart on the calculated branch target 204 is requested for instruction fetching (I-Fetch) logic 212 in response to the wrt.

FIG. 2 also depicts an example of dual pipelined instruction decoding and execution. Decode pipe 0 branch information 214 and decode pipe 1 branch information 216 provide input to both the I-Fetch logic 212 and sequential branch information queue 218. In an exemplary embodiment, the sequential branch information queue 218 can determine whether a SGT occurred. For example, the sequential branch information queue 218 may be incorporated in the IDU 106 of FIG. 1, determining whether a branch taken was a surprise or not. If an SGT is detected, the pre-wrt compare multiplexer 208 outputs a value from the recycle queue 202 to the compare block 210; otherwise a value from a predicted target queue 220 is output to the compare block 210. The predicted target queue 220 can hold predicted branch target 222 values, as calculated by BPL in the IFU 102 of FIG. 1. The predicted branch target 222 values are also referred to as speculatively computed address values, which can be generated by the BPL in the IFU 102 of FIG. 1. If no SGT is detected, a value from the predicted target queue 220 is compared against the calculated branch target 204 to determine if the wrong target was fetched on the last pass of the branch. Therefore, it is not necessary to restart the I-Fetch 212 to re-fetch an instruction on each pass of recycling, but only if the wrong target is detected. This takes advantage of the most common cases of there being no need to recycle, or that the speculated address was correct and does not change under recycle.

The I-Fetch 212 may also include throttle logic 224. The throttle logic 224 can limit access to a higher level of memory upon a cache miss when instruction fetching is restarted. The throttle logic 224 of FIG. 2 blocks/throttles the I-Fetch 212 from going to the L2 cache 116 if there is an L1 miss (at I-Cache 104 and/or D-Cache 112). Therefore, if there is a incorrect calculated branch target 204 and the address/data happens to be in the I-Cache 104, it is delivered and later flushed on the corrective restart based on the wrt. However, if it is not in the L1, this mechanism avoids the unnecessary memory hierarchy activity and potential performance degradation of removing a potentially useful line in the I-Cache 104 to bring in that based on an incorrect calculated branch target 204.

Figure 3:
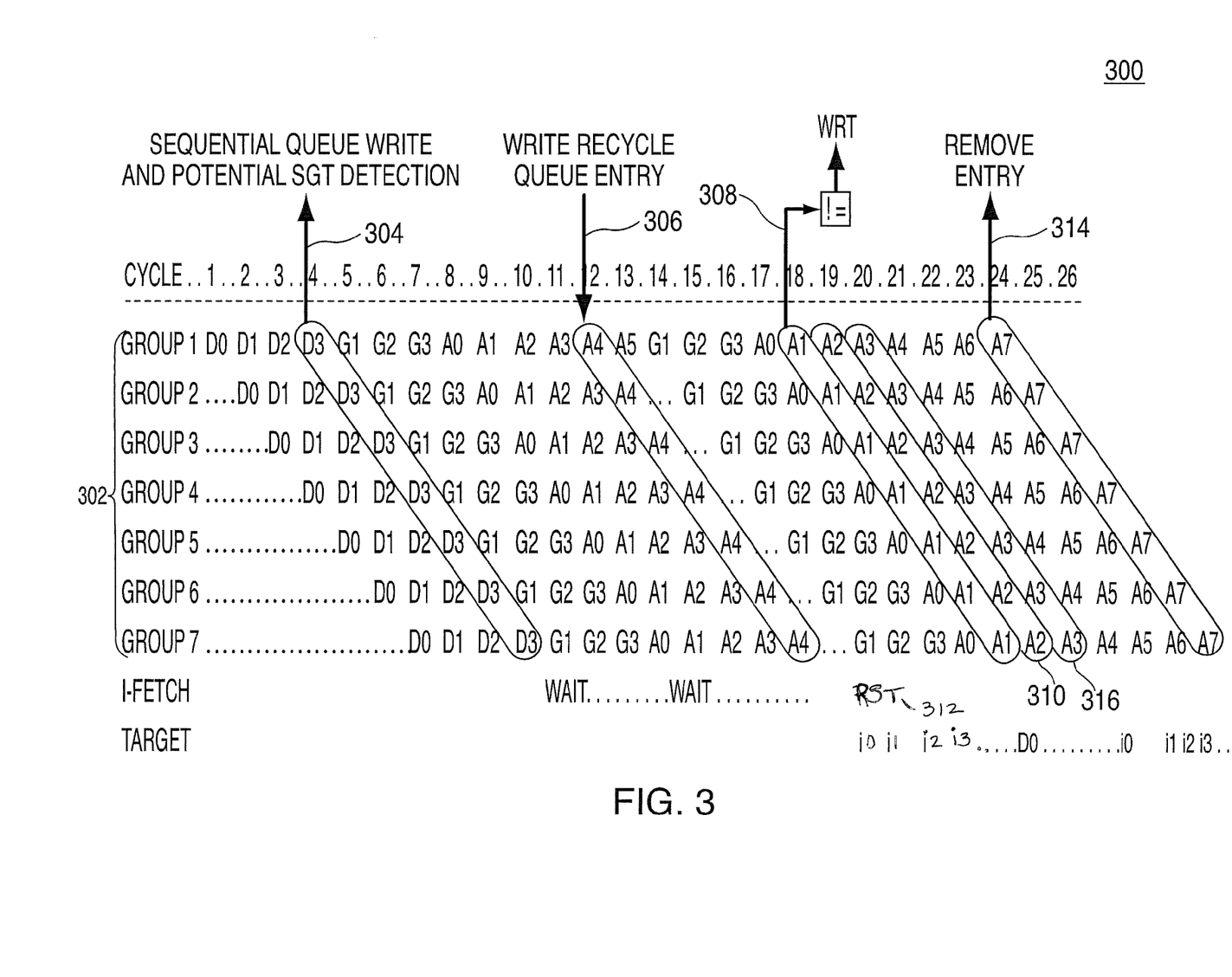
FIG. 3 depicts a block diagram of an instruction stream in a processor pipeline in accordance with an exemplary embodiment.

FIG. 3 illustrates an exemplary timing diagram 300 with multiple groups of instructions 302 passing through various pipeline stages over a series of cycles. The pipeline stages may represent more detailed pipeline stages within the system 100 of FIG. 1. For example, pipeline stages can include D0-D3 to decode instructions (e.g., at IDU 106 of FIG. 1), G1-G3 to dispatch instructions, A0 to perform address generation (e.g., at AGEN 108 of FIG. 1), A1-A3 for cache access (e.g., at LSU 110 of FIG. 1), A4 to execute instructions (e.g., at arithmetic unit 114 of FIG. 1), A5 to put away results and recycle instructions on failure conditions, and A6-A7 to retire instructions. Writes to the sequential branch information queue 218 of FIG. 2 and potential SGT detection may occur in stage D3 as indicated at arrow 304. In an exemplary embodiment, the write of an entry to the recycle queue 202 of FIG. 2 occurs at stage A4, as indicated by arrow 306. At stage A2 310 occurring after writing the entry to the recycle queue 202 of FIG. 2, a SGT branch early target fetch may be detected as a wrt on recycle as indicated at arrow 308. Stage A3 316 corresponds to an instruction fetching restart 312 for the correct target following the wrt. By stage A7 314, the corresponding entry for the wrt determination is removed from the recycle queue 202.

Figure 4:
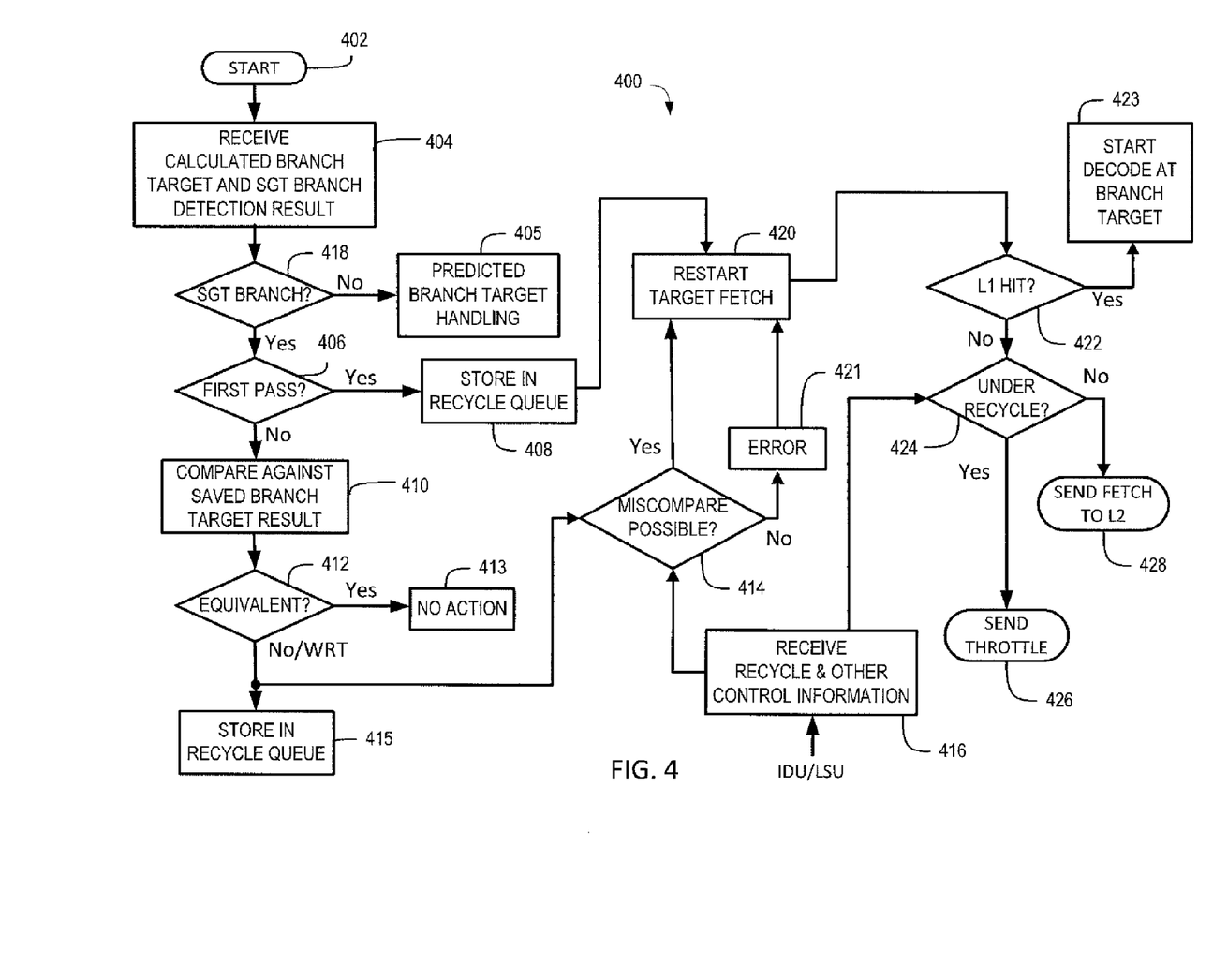
FIG. 4 depicts a process for controlling restarting of instruction fetching using speculative address computations in accordance with an exemplary embodiment.

Turning now to FIG. 4, a process 400 for controlling restarting of instruction fetching using speculative address computations in a processor will now be described in reference to FIGS. 1-3 and in accordance with an exemplary embodiment with respect to the IFU 102 of FIG. 1 to handle SGT branches. At block 402, the process 400 starts. At block 404, a calculated branch target 204 is received from the AGEN 108 of FIG. 1 along with decode branch information for an SGT branch instruction via signal 118 from the IDU 106 of FIG. 1. A check is performed at block 418 to test for an SGT branch based on signal 118. If there is not an SGT branch at block 418, then predicted branch target handing is performed at block 405 using the predicted target queue 220 of FIG. 2. If an SGT branch is detected at block 418, a check as to whether this is the first pass through the process 400 may be performed in block 406. If this is the first pass, then block 408 writes the calculated branch target 204 in the recycle queue 202. If this is not the first pass, a compare is performed between the calculated branch target 204 and a value previously saved in the recycle queue 202 in block 410. If the values are equivalent, then no further actions need to be performed as indicated at block 413. However, if block 412 determines that the calculated branch target 204 and the value previously saved in the recycle queue 202 are not equivalent (wrt), a further check may be performed to determine if a possible mismatch or miscompare 414 occurred. The wrt may also initiate writing the calculated branch target 204 in the recycle queue 202 in block 415. The check for the possible miscompare 414 can analyze the state of received and other control information 416, e.g., from IDU 106 and LSU 110 of FIG. 1, to assist in making the determination. If a miscompare was possible at block 414 or this is the first pass as determined by block 406 then block 420 restarts the target fetch (e.g., at I-Fetch 212 or IFU 102). However, if it was determined at block 414 that a miscompare was not possible, then an error is signaled at block 421 and block 420 restarts the target fetch. A further check is performed at block 422 to determine if the restart of the target fetch in block 420 results in an L1 cache hit (e.g., D-Cache 112). If an L1 cache hit occurred, then decoding by the IDU 106 will start at the branch target at block 423. If not, an L1 cache miss occurred, and a further check is performed at block 424 to determine if recycling is active. On a SGT branch target fetch, when under a recycle event, throttling is performed at block 426 to prevent higher levels of the cache hierarchy from being modified as a result of restarting fetching; otherwise, the fetch is allowed to proceed to L2 cache 116 at block 428. This prevents altering higher levels of the memory hierarchy for fetching intermediate values that may not be correctly resolved.

RAS benefits can result from the knowledge that some instructions, being non-dependent on resources that can change under recycle, should have the same calculated target address through each pass of recycle. This check may be performed in block 414. If there is a miscompare, but one is not expected/possible, an error is signaled at block 421. This scheme provides multi-bit flip protection under numerous recycle conditions. For example, in a recycle due to address mode changes, the compare in block 414 can be isolated to the address range that is not affected by the addressing mode change. Thus, results of a mismatch in block 412 are further verified as a function of instruction type in block 414, prior to restarting the instruction fetching in block 420.

To optimize for the restarting, the IFU 102 may initiate fetching before a branch's calculated target address 204 can be confirmed, i.e., past recycle. It should be noted that in most cases the calculated branch target 204 is correct, leading to an overall performance gain. This is because in most cases there is either no recycle or the initial calculated target addresses are correct (e.g., the branch is not necessarily dependent on a recycled instruction). However, because there can be an incorrectly calculated address, the case that the initial restart address is incorrect is handled via blocks 406-414.

It will be understood that the process 400 can be applied to any processing circuitry that incorporates a processor pipeline. For example, process 400 can be applied to various digital designs, such as a microprocessor, an application specific integrated circuit (ASIC), a programmable logic device (PLD), or other such digital devices capable of processing instructions. Therefore, the system 100 of FIG. 1 can represent a variety of digital designs that incorporate processing circuitry.

Technical effects and benefits include increased processing system efficiency by reducing delay penalties associated with waiting to fully resolve dependencies. For example, speculative restarting can remove five cycles from the restart penalty over waiting until the results are beyond the recycle point (e.g., L1 miss). Each recycle can add another five or more to the base restart penalty. This is now only observed by the processor if the initial calculated branch target was incorrect, requiring a restart on recycle due to a wrong target. The wrong target restart point, though two cycles worse than the speculative restart point, can be at least three cycles better than waiting for the recycle point, per recycle. Another benefit includes increased RAS quality of the address generator stages. Using a recycle queue can enable multiple iterations of checking for mismatches between a currently calculated branch target and saved branch target values. Mismatches can be further verified to identify error conditions, such as single event upsets, that caused an address bit to change state, rather than a true SGT.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for controlling restarting of instruction fetching via speculative address computations in a processor, the system comprising:
   an address generator;
   a predicted target queue;
   target selection logic including a recycle queue, the recycle queue configured to store calculated branch targets of branch instructions for use during a recycle operation, wherein a speculative branch instruction is repeatedly inserted in a pipeline of the processor for repeated address generation of a target address until a calculated branch target of the speculative branch instruction is resolved; and
   a compare block, the system for performing a method comprising:
   receiving a calculated branch target address of a branch instruction to be executed and decode branch information for a surprise guess taken (SGT) branch instruction, the SGT branch instruction being a non-predicted guess taken branch, and the address generator calculating the calculated branch target address as a surprise branch target after a surprise branch is decoded;
   determining that the branch instruction is the SGT branch instruction based on decode branch information;
   initiating instruction fetching of an instruction stream at the calculated branch target address;
   storing the calculated branch target address in the recycle queue where the calculated branch target address is based on a speculative result of an older instruction;
   initiating a recycle operation of the SGT branch instruction, the SGT branch instruction having no entry in the predicted target queue, the SGT branch instruction having a branch target address in the recycle queue;
   receiving a current calculated branch target value from the address generator for the SGT branch instruction;
   selecting a saved branch target value from the recycle queue based on determining that the branch instruction is the SGT branch instruction;
   selecting the saved branch target value from the predicted target queue based on determining that the branch instruction was predicted;
   determining, by the compare block, that a mismatch exists between the saved branch target value and the current calculated branch target; and
   restarting instruction fetching of an instruction stream for the SGT branch instruction at the current calculated branch target based on determining that the mismatch exists.

2. The system of claim 1 wherein the target selection logic selects a previously speculatively calculated branch target value from the recycle queue based on detecting that a surprise branch was taken.

3. The system of claim 2 wherein an instruction decode unit determines that the surprise branch that was not predicted by branch prediction logic is guessed taken.

4. The system of claim 1 further comprising:
   throttle logic to limit access to a higher level of memory upon a cache miss when the instruction fetching is restarted, wherein the throttle logic limits instruction cache (ICache) access based on a wrong target detected on a predicted taken branch target address in the predicted target queue based on a target computation which is dependent on older recycled pipelined instructions.

5. The system of claim 1 wherein address values from the predicted target queue are computed by branch prediction logic.

6. The system of claim 1 wherein the mismatch is further verified as a function of instruction type prior to restarting the instruction fetching.

7. A method for controlling restarting of instruction fetching using speculative address computations in a processor, the method comprising:
   receiving a calculated branch target address of a branch instruction to be executed and decode branch information for a surprise guess taken (SGT) branch instruction, the SGT branch instruction being a non-predicted guess taken branch, and an address generator calculating the calculated branch target address as a surprise branch target after a surprise branch is decoded;
   determining that the branch instruction is the SGT branch instruction based on decode branch information;
   initiating instruction fetching of an instruction stream at the calculated branch target address;
   storing the calculated branch target address in a recycle queue where the calculated branch target address is based on a speculative result of an older instruction;

initiating a recycle operation of the SGT branch instruction, the SGT branch instruction having no entry in a predicted target queue, the SGT branch instruction having a branch target address in the recycle queue;

receiving a current calculated branch target value from the address generator for the SGT branch instruction;

selecting a saved branch target value from the recycle queue based on determining that the branch instruction is the SGT branch instruction, the recycle queue storing calculated branch targets of branch instructions for use during a recycle operation, wherein a speculative branch instruction is repeatedly inserted in a pipeline of the processor for repeated address generation of a target address until a calculated branch target of the speculative branch instruction is resolved;

selecting the saved branch target value from a predicted target queue based on determining that the branch instruction was predicted;

determining that a mismatch exists between the saved branch target value and the current calculated branch target; and instruction fetching of an instruction stream for the SGT branch instruction at the current calculated branch target based on determining that the mismatch exists.

8. The method of claim 7 wherein a previously speculatively calculated branch target value is selected based on detecting that a surprise branch was taken.

9. The method of claim 8 wherein an instruction decode unit determines if the surprise branch was taken.

10. The method of claim 7, further comprising:
limiting access to a higher level of memory upon a cache miss when the instruction fetching is restarted, wherein instruction cache (ICache) access is limited based on a wrong target detected on a predicted taken branch target address in the predicted target queue based on a target computation which is dependent on older recycled pipelined instructions.

11. The method of claim 7 wherein the mismatch is further verified as a function of instruction type prior to restarting the instruction fetching.

12. The method of claim 7 further comprising:
performing a corrective restart based on determining that a last address used to speculatively restart is wrong.

13. A system for controlling restarting of instruction fetching via speculative address computations in a processor, the system comprising:
an instruction fetching unit (IFU) including branch prediction logic (BPL);
an instruction decoding unit (IDU) including surprise guess taken (SGT) detection logic; and
an address generator (AGEN), the system for performing a method comprising:
receiving a calculated branch target address of a branch instruction to be executed and decode branch information for a SGT branch instruction, the SGT branch instruction being a non-predicted guess taken branch, and the AGEN calculating the calculated branch target address as a surprise branch target after a surprise branch is decoded;

determining that the branch instruction is the SGT branch instruction based on decode branch information;

initiating instruction fetching of an instruction stream at the calculated branch target address;

storing the calculated branch target address in a recycle queue where the calculated branch target address is based on a speculative result of an older instruction;

initiating a recycle operation of the SGT branch instruction, the SGT branch instruction having no entry in a predicted target queue, the SGT branch instruction having a branch target address in the recycle queue;

calculating, by the AGEN, a current calculated branch target for the SGT branch instruction;

selecting a saved branch target value from the recycle queue based on determining that the branch instruction is the SGT branch instruction, the recycle queue storing calculated branch targets of branch instructions for use during a recycle operation, wherein a speculative branch instruction is repeatedly inserted in a pipeline of the processor for repeated address generation of a target address until a calculated branch target of the speculative branch instruction is resolved;

selecting the saved branch target value from a predicted target queue based on determining that the branch instruction was predicted;

determining that a mismatch exists between the saved branch target value and the current calculated branch target; and restarting instruction fetching of an instruction stream for the SGT branch instruction at the current calculated branch target based on determining that the mismatch exists.

14. The system of claim 13 further comprising:
a load store unit (LSU), wherein the LSU is capable of determining a data cache access miss and signaling a reject to recycle.

15. The system of claim 13 wherein address values are stored in the predicted target queue and a previously speculatively calculated branch target is stored in the recycle queue.

16. The system of claim 13 further comprising:
throttle logic to limit access to a higher level of memory upon a cache miss when the instruction fetching is restarted, wherein the throttle logic limits instruction cache (ICache) access based on a wrong target detected on a predicted taken branch target address in the predicted target queue based on a target computation which is dependent on older recycled pipelined instructions.

17. The system of claim 13 wherein the mismatch is further verified as a function of instruction type prior to restarting the instruction fetching.

* * * * *